Aug. 7, 1973  W. F. GIDICK  3,751,342
REVERSING MECHANISM FOR COKE OVEN BATTERY
Filed Dec. 30, 1970  6 Sheets-Sheet 1

INVENTOR.
WARD F. GIDICK

BY Sherman H Barber
Attorney

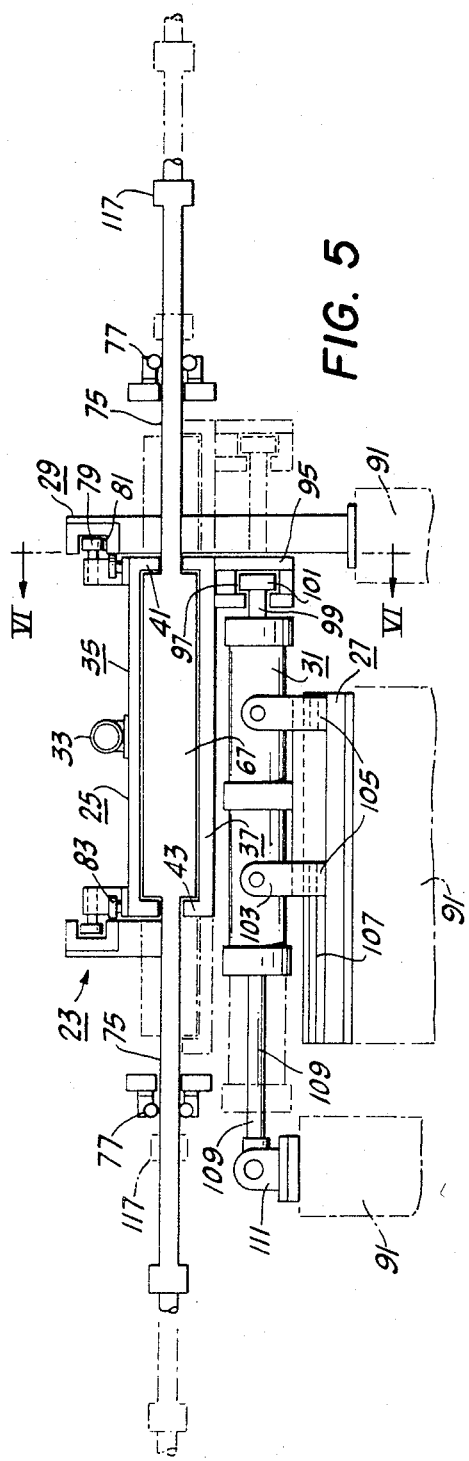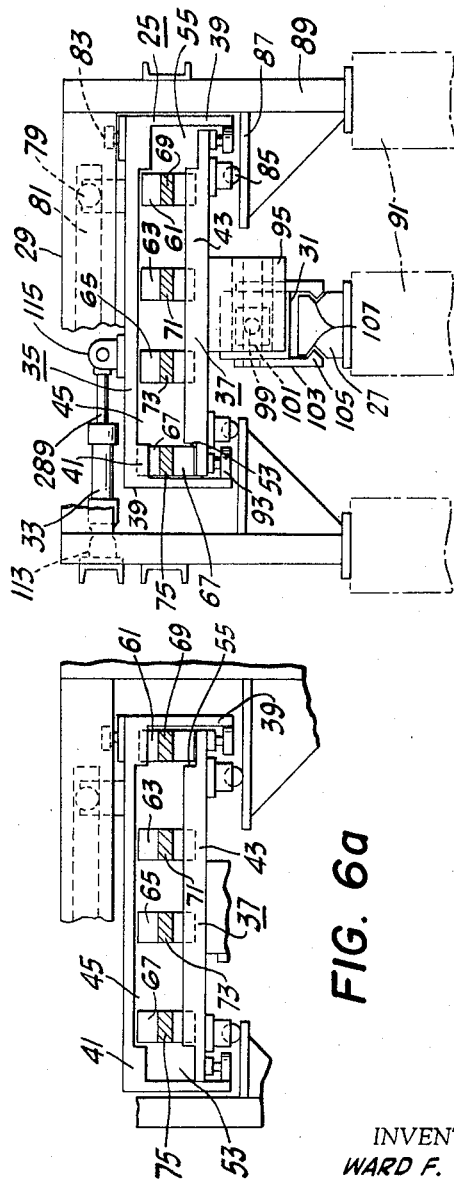

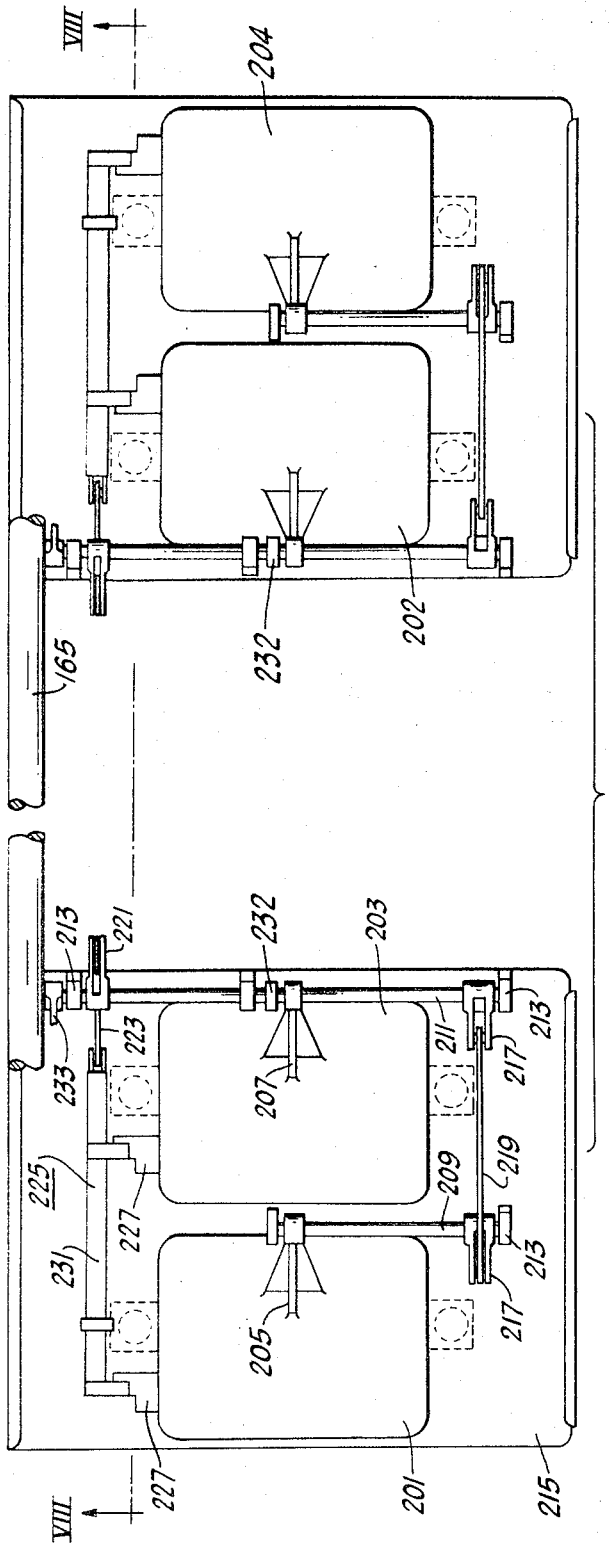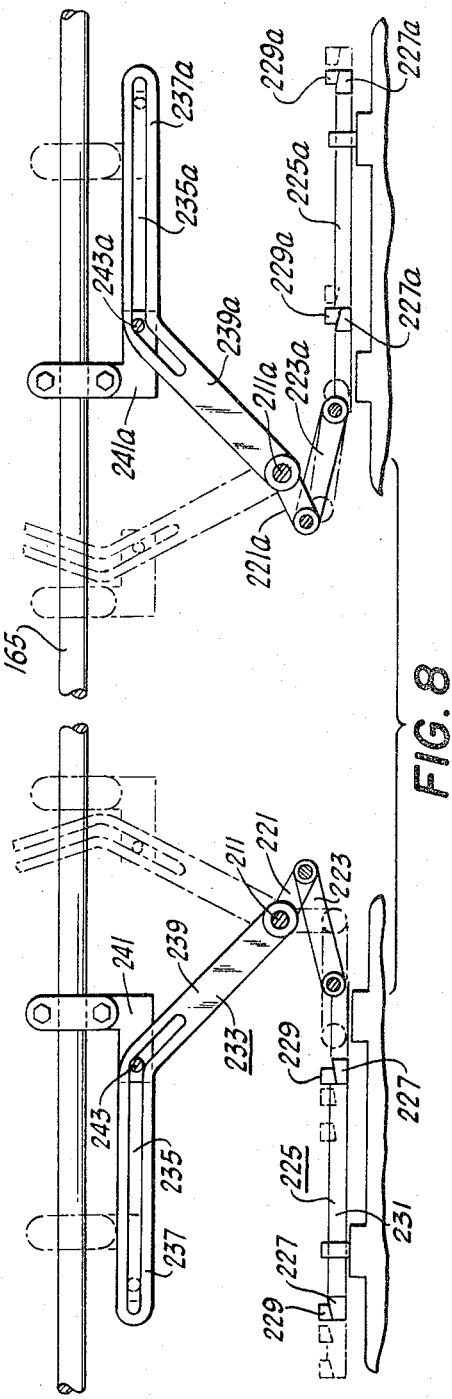
FIG. 7
FIG. 8
INVENTOR.
WARD F. GIDICK

INVENTOR.
WARD F. GIDICK
BY Sherward H Barker
Attorney

INVENTOR.
WARD F. GIDICK

United States Patent Office

3,751,342
Patented Aug. 7, 1973

3,751,342
REVERSING MECHANISM FOR COKE
OVEN BATTERY
Ward F. Gidick, West Newton, Pa., assignor to
Koppers Company, Inc.
Filed Dec. 30, 1970, Ser. No. 102,853
Int. Cl. C10b 5/12, 21/10; F16k 11/00
U.S. Cl. 202—141                                13 Claims

ABSTRACT OF THE DISCLOSURE

A reversing mechanism for a coke oven battery includes a movable reversing plate, a locking plate, and a plurality of bars coacting with the reversing plate and connecting to actuator rods which are connected to the fuel and air valves of the coke oven battery. A fluid actuated cylinder moves the reversing plate to reverse the heating cycle, and a fluid actuated cylinder moves the locking plate to change the type of fuel burned in the heating flues.

SUMMARY OF THE INVENTION

The invention comprises a reversing plate and a spaced-apart locking plate with a plurality of cooperating members disposed between such plates. Each member is connected to a plurality of fuel or air valves and means is provided to move the reversing plate along an axis. When the reversing plate and locking plate are in one position relative to the members, only certain members move when the reversing plate moves thereby changing the heating cycle of a coke oven battery which is burning a particular type of fuel. Means is provided to shift the reversing plate and locking plate to another position relative to the members and then when the reversing plate moves, the heating cycle, using another type of fuel changes.

BACKGROUND OF THE INVENTION

This invention relates to coke ovens and, more particularly, to a mechanical mechanism for reversing the valves controlling the flow of air and gas through the flues of the heating walls of the coke battery.

In the operation of a conventional horizontal coke oven it is customary to burn gaseous fuel in one heating flue of a pair of flues during the "on-cycle" and to direct the hot gases of combustion of such gaseous fuel into the other flue during its "off-cycle." Periodically, say about every twenty-five minutes, the burning of fuel in the "on flues" ceases and these flues become the "off flues" while the original "off flues" become "on flues," as gaseous fuel is burned in them.

The change over from "on flues" to "off flues" is carried out by reversing certain valves in the basement of the coke oven battery. Reversing may be done manually, by an electro-mechanical mechanism, by hydro-mechanical means, or by mechanical mechanism, associated with a timer mechanism set to induce reversal at prescribed time intervals. It is customary to provide mechanical or electrical interlocks in any reversing system to ensure that the proper sequence of operations is carried out.

The sequential burning of fuel gas in high and low burners in the heating wall flues presents problems in the proper control of the flow of air, waste heat, fuel gas, and decarbonizing air to the coke oven battery flues. In a horizontal coke oven battery, wherein the direction of the flow of air and waste gas is periodically reversed, additional control problems are encountered, such as the proper sequential operation of the valves controlling the flow of gas and decarbonizing air to the burners.

The control of the flow of fuel gas and the flow of decarbonizing air to the high and the low burners in two groups of flame flues, and the flow of combustion air and waste heat to the same two groups of flame flues increases the number of sequential steps in the operation of a coke oven battery. The steps must be timed to occur in a predetermined sequence, and all of the control components associated therewith must function properly.

BRIEF DESCRIPTION OF THE DRAWINGS

The drawings illustrate one embodiment of the invention wherein:

FIG. 5 is a view along line V—V of FIG. 4;

FIG. 6 is a view along line VI—VI of FIG. 4;

FIG. 6a is a view similar to FIG. 6 showing a part of the apparatus of FIG. 4 in another position;

FIG. 7 is a schematic plan view of the top of a pair of air boxes of a coke oven;

FIG. 8 is a view along line VIII—VIII of FIG. 7;

DETAILED DESCRIPTION

Figure 1:
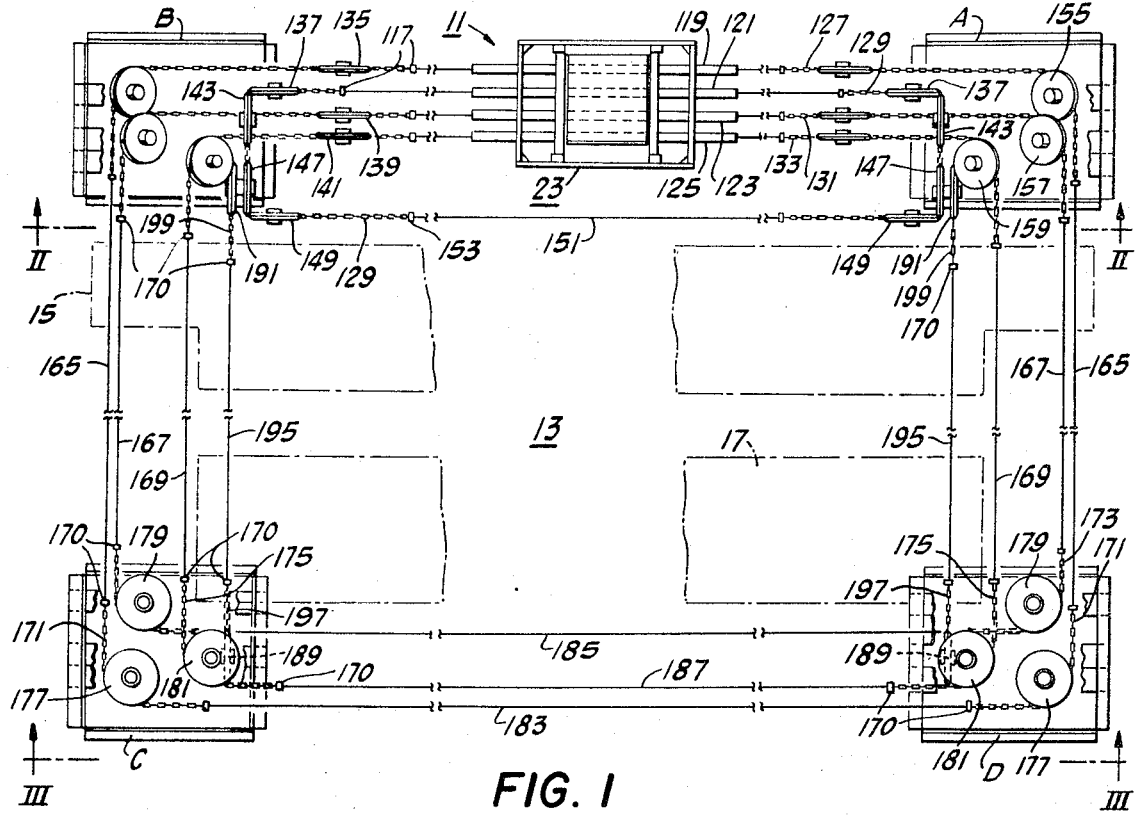
FIG. 1 is a schematic plan view of a reversing mechanism for a coke oven battery in accordance with the invention.

FIG. 1 illustrates schematically a reversing mechanism 11 for a coke oven battery 13; the end pinion walls 15, 17 being shown in phantom outline. Most of the structure shown in FIGS. 1-3 is supported on the alley floor 19, but a small portion of the structure is supported at the basement floor level 21.

From FIG. 1 it will be noted that there is a hydraulic reversing machine or actuator 23 situated about at the mid-length point of the pinion wall 15, and that, at each of the four corners of the coke oven battery 13, there is an arrangement of sprockets mounted to fixed structure. In FIG. 1, the sprocket arrangements A and B are similar, but to opposite hand, and sprocket arrangements C and D are also similar but to opposite hand.

Figure 4:
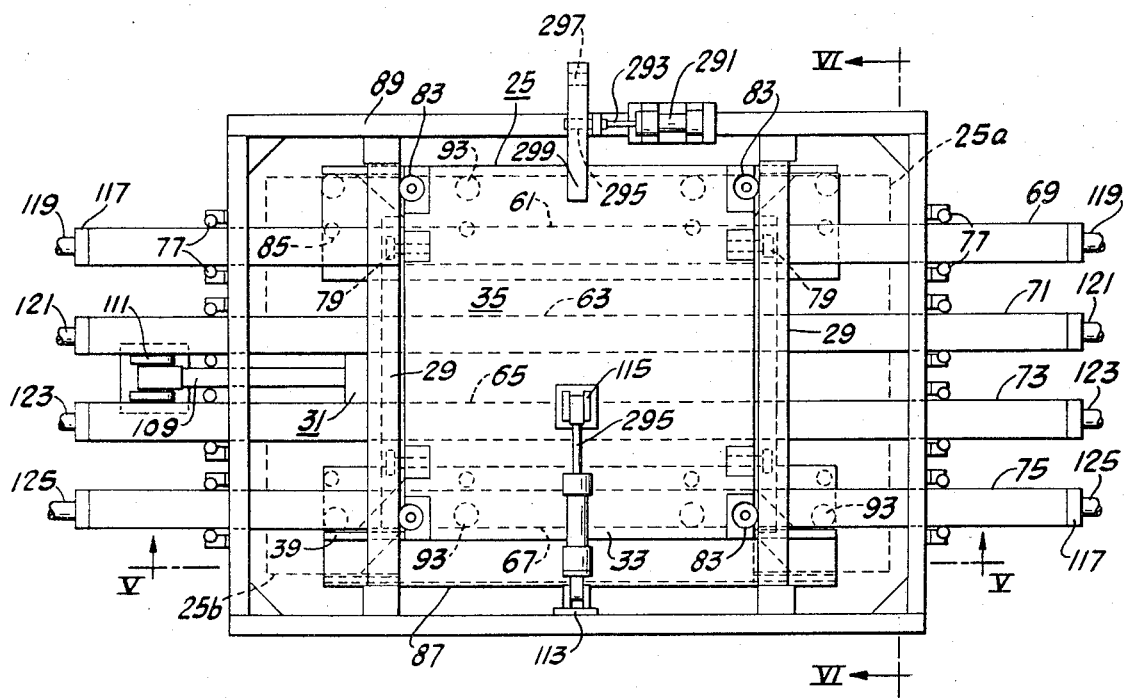
FIG. 4 is a plan view at larger scale of a portion of the apparatus of FIG. 1.

The hydraulic reversing machine or actuator 23 is shown in FIGS. 4–6. It comprises: a reversing mechanism 25, a main longitudinal guide support 27; transverse guides 29; a reversing piston-cylinder assembly 31; and a change-over, piston-cylinder assembly 33.

Figure 2:
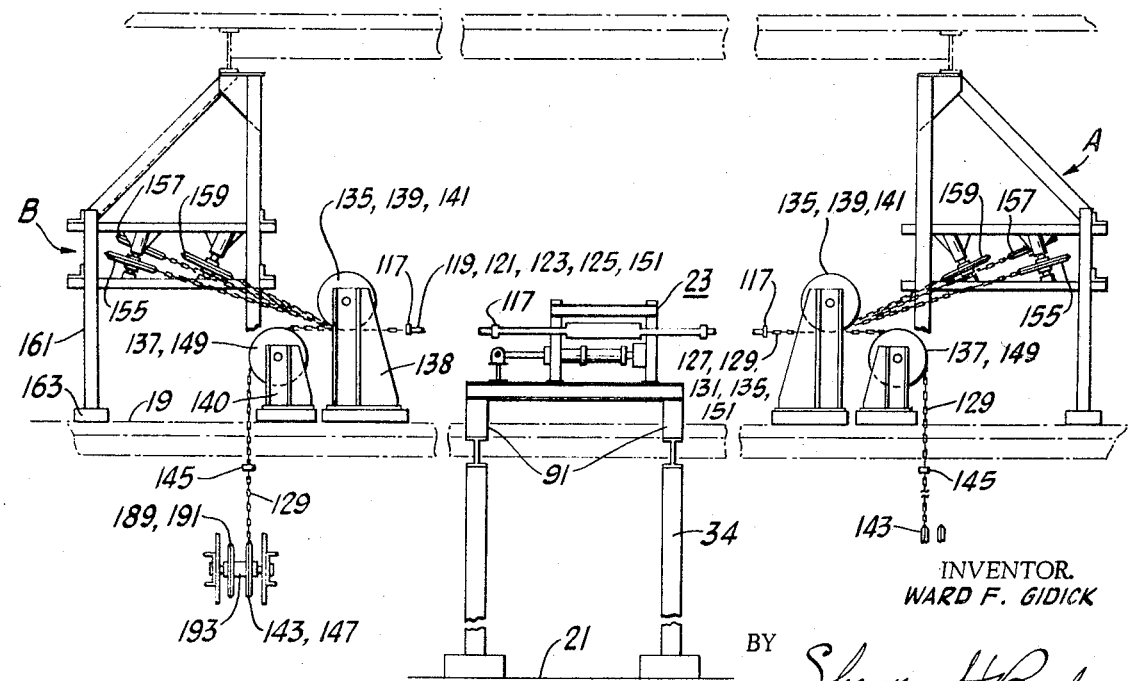
FIG. 2 is a view along line II—II of FIG. 1.
Figure 3:
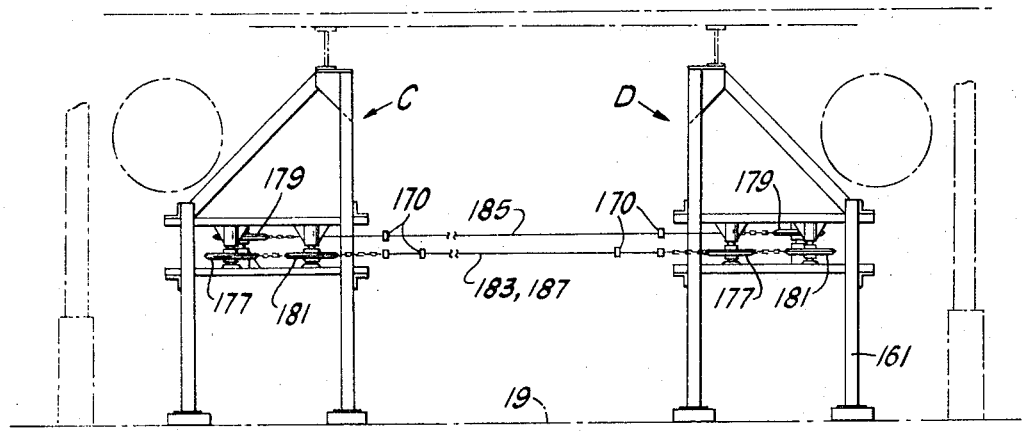
FIG. 3 is a view along line III—III of FIG. 1.

The hydraulic reversing machine 23 is mounted preferably to the supporting structure 34 fixed to the basement, as suggested in FIG. 2.

The reversing mechanism 25 is generally rectangular in shape having planar top or locking plate 35 and a bottom reversing table 37 that are disposed in spaced-apart parallel relation. The top or locking plate 35 is provided with depending sides 39 that overlap the reversing table 37, as shown in FIG. 6. Thus, the locking plate 35 and reversing table 37 are movable laterally together, as viewed in FIG. 6, but the reversing table 37 alone is movable lengthwise (from right to left and back again) as view in FIGS. 4 and 5. The locking plate 35 is provided with a downwardly directed flange 41 at each end, and the reversing table is provided with an upwardly directed flange 43 at each end.

The top flanges 41 are provided with a single centrally located notch 45, and the bottom flanges 43 are provided with two rectangular notches 53, 55. The notches 53, 55 are of substantially the same size and shape and they are located at the outer ends of the flanges 43, as shown in FIGS. 6 and 6a.

Within the reversing mechanism 25, and disposed between the locking plate 35 and reversing table 37 and between the end flanges 41, 43, there are four elongate rectangular bars 61, 63, 65, 67. These bars rest on and are movable with the reversing table 37 except as noted hereinafter.

Each rectangular bar 61, 63, 65, 67 is connected at each end to an actuator bar 69, 71, 73, 75 that cooperate each with respective bearings 77 for guiding the actuator bars 69, 71, 73, 75 when they move laterally, as viewed in FIG. 4.

The locking plate 35 is supported by rollers 79 that are horizontally journaled to it and that cooperate with a slot 81 in the guide 29. Another vertically journaled roller 83 also coacts with the guide 29 as the locking plate 35 moves, under the influence of the change-over piston-cylinder arrangement 33, from right to left and back again, as viewed in FIG. 6.

FIG. 6 shows the reversing table 37 and locking plate 35 in one operative position relative to the elongate bars 61, 63, 65, 67 and FIG. 6a shows the reversing table 37 and locking plate 35 in another operative position relative to the elongate bars. The bars do not move laterally, as viewed in FIGS. 6 and 6a.

Likewise, the reversing table 37 is provided with caster-type bearings 85 that cooperate with bearing plates 87, mounted to vertical supports 89, that carry the guides 29. The vertical supports 89 are set in suitable foundations 91, as suggested in FIG. 6. The reversing table 37 also carries a plurality of vertically journaled rollers 93 that coact with the depending side members 39, particularly when the reversing table moves as described hereinafter.

The reversing table 37 also carries a depending slotted guide 95 which extends across the reversing table, as suggested in FIG. 6, with a slot 97 therein. A piston rod portion 99 of the piston-cylinder assembly 31 has a T-head end 101 that cooperates with the slot 97; wherefore, the reversing plate 37 is movable laterally (as viewed in FIG. 5) relative to the piston-cylinder assembly 33 by the piston-cylinder 31.

The piston-cylinder assembly 31 is supported by a pair of spaced-apart legs 103 carrying shoes 105 that are shaped so as to coact with longitudinal V-shaped grooves 107 in the main guide support 27. The piston-cylinder assembly 31 is subdivided lengthwise into two chambers 263, 265 by an internal diaphragm 108 (FIGS. 9a–9d) and is provided with a piston-rod assembly 99 at the right-hand end, and a piston-rod assembly 109 at the left-hand end. Each piston-rod assembly 99, 109 is movable by fluid pressure in its respective chamber 263 or 265. The piston-rod 109 is anchored to a fixture 111 mounted to the foundation 91, wherefore the piston-rod 109 does not move.

The change-over piston-cylinder assembly 33 is secured at one end 113 (the cylinder end) to the support structure 89, and the piston rod 289 (FIGS. 10a, 10b) secured to a clevis 115 that is fixed to the locking plate 35.

Each rectangular bar 69, 71, 73, 75 is connected to an adaptor 117 that also connects to a cylindrical acutuator rod 119, 121, 123, 125.

Referring to FIG. 1, it will be noted that each one of the actuator rods 119, 121, 123, 125 connects to a length of chain 127, 129, 131, 133 and that the chains coact with sprockets 135, 137, 139, 141. The sprockets 135, 139, 141 are journaled to suitable structural supports 138, and the sprocket 137 is journaled to a suitable structural support 140. Both supports 138, 140 are fixed to the alley floor 19 in conventional manner.

The chain 129 coacts with sprocket 137 and with another sprocket 143 located at a level somewhat below the alley floor 19, as shown in FIG. 2. Intermediary chain guides 145 are, of course, provided where needed to conduct the chain properly. The chain 129 leads from sprocket 143 to another sprocket 147 situated at the same level as sprocket 143. From sprocket 147 the chain 129 leads upwardly to and cooperates with a sprocket 149 that is disposed at the same level as sprocket 137. Between the sprockets 149 (FIG. 1) there is a length of actuator rod 151 to which the chains 129 are connected as at 153. Suitable guides may be provided for the chain 129 and the actuator rod 151 as necessary.

In like manner, the other lengths of chain 127, 131, 133 coact respectively with sprockets 155, 157, 159 that are incorporated in the sprocket arrangements A and B. The sprocket arrangement A is similar to the arrangement B, but B is made to the opposite hand. Each sprocket arrangement A, B includes a fixed frame structure 161 that is secured to a suitable foundation 163 at the alley level 19, and the sprockets 155, 157, and 159 are journaled with inclined axes, about as shown in FIG. 2.

From the sprockets 155, 157, 159, the chains 127, 131, 133 connect to actuator rods 165, 167, 169 that extend the full length of the coke oven battery 13. Suitable rod support guides 170 are provided at spaced-apart strategic locations. The actuator rods 165, 167, 169 also connect to other lengths of chain 171, 173, 175, respectively, that cooperate with sprockets 177, 179, 181. These sprockets are journaled in sprocket arrangements C and D of FIG. 3, the structure of which is similar to the support structure 161.

From the sprockets 177, 179, 181, the chains 171, 173, 175 lead horizontally and connect to the ends of actuator rods 183, 185, 187, respectively, that are supported at strategic locations by guides 170.

A sprocket 191 is fixed to a shaft 193 to which sprocket 147 is secured. Spaced-apart from sprocket 191, and located at substantially the same level, is another sprocket 189 that is suitably journaled. An actuator rod 195 connects to the ends of chains 197, 199 cooperating respectively with sprockets 189, 191 and forming an endless loop around these sprockets.

The operating levers of the waste gas valves and the operating levers of the air lids on the air boxes are connected to the actuator rods 195. When the reversing table 37 moves, as described hereinafter, the elongate rod 63 moves also and this causes the actuator rods 195 to move synchronously to actuate the waste gas valves and the air lids on the air boxes.

FIGS. 7 and 8 illustrate mechanisms for opening and closing the air box lids 201, 203, and 202, 204 which mechanisms are connected to the actuator rod 165 (FIGS. 7 and 8) and which are operable when such actuator rod is moved by the reversing mechanism 23.

Each pair of air box lids 201, 203 and 202, 204 is provided with a bracket 205, 207 that is fixed to a shaft or actuator rod 209, 211, respectively.

The shafts 209, 211 are journaled at 213 to the top of the air box 215 and the shafts 209, 211 are provided each with a bifurcated arm 217 that receives, and is pin connected to a connecting lever 219. The connecting lever linking both lids together so that both open and close simultaneously.

The shaft 211 extends to one side of the air box 215 and a bifurcated arm 221 that is fixed to the shaft 211 is pin connected to a link 223 connected to a locking mechanism 225.

The locking mechanism 225 comprises conventional fixed wedge members 227 on the air lids 201, 203 with which other wedge members 229, mounted on a laterally movable bar 231, cooperate; the bar 231 is connected to and is movable by means of the lever 223.

A clutch 232 is located in shaft 211 which permits the locking mechanism 225 to move before the clutch 232 engages the remainder of shaft 211 that is connected to the air lids 201, 203 and 202, 204.

Adjacent the far end of the actuator rod 211, there is fixed thereto a bell-crank 233 that has an elongate slot 235 in both a horizontal leg-portion 237 and an angularly inclined leg-portion 239, as shown in FIG. 8. An angle-shaped clamp 241 is secured to the actuator rod 165, and the clamp 241 carries a pin 243 that is slidable in the slot 235.

While the foregoing describes the apparatus in the left-hand portion of FIGS. 7 and 8, it will be understood that the apparatus shown in the right-hand portion of FIGS. 7 and 8 is similar but to the opposite hand.

FIGS. 9a, 9b, 9c, and 9d illustrate schematically an hydraulic or a fluid control system that actuates the reversing piston-cylinder assembly 31. FIGS. 10a, 10b illustrate schematically an hydraulic or fluid control system that actuates the change-over piston-cylinder assembly 33.

In order to effect a reverse in the heating of the flues of a coke oven battery from the 2, 3 heating cycle or the 1-4, 5 heating cycle, it is necessary first to place the air, waste heat, coke oven gas and blast furnace gas valves in a neutral position. When the reversing cylinder 31 is in the position shown in FIG. 9a, such valves are in the neutral position.

Figure 9B:
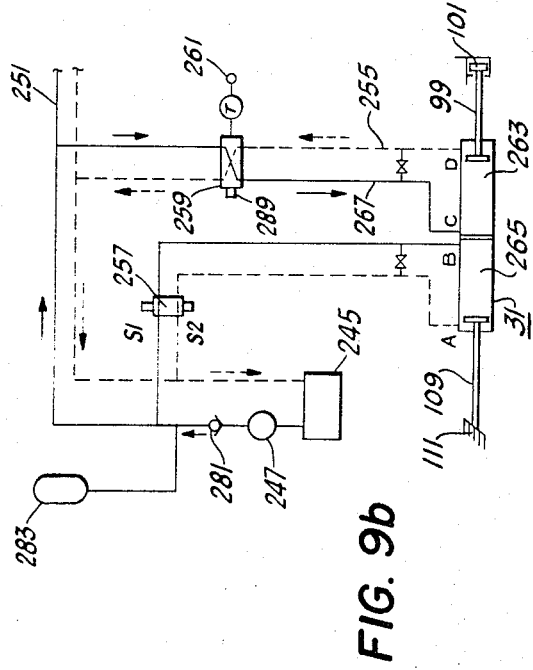
FIGS. 9a-9d are schematic flow diagrams illustrating the sequence of operations.
Figure 9D:
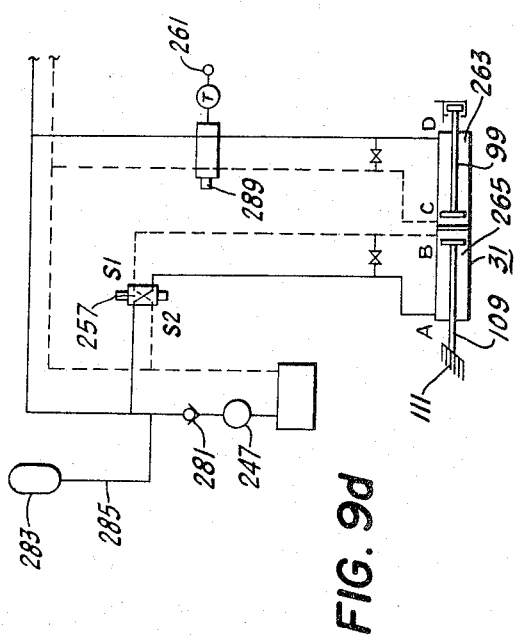
Figure 9A:
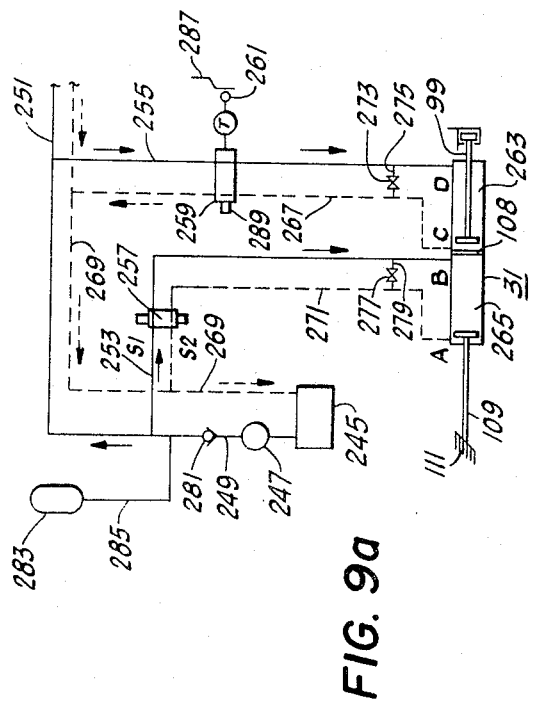
Figure 9C:
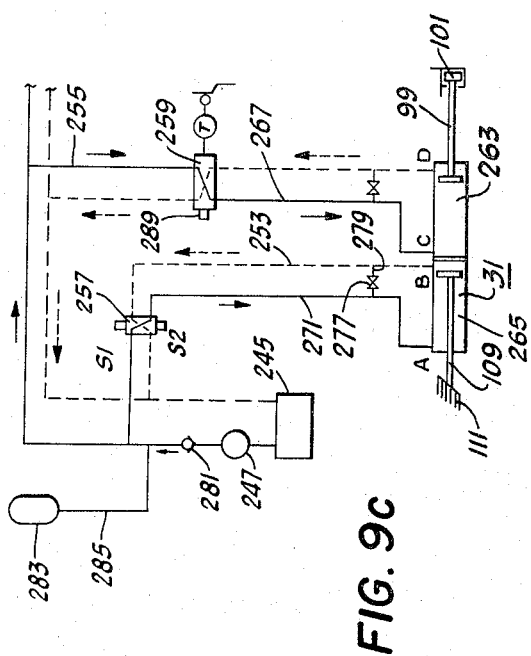
Figure 10A:
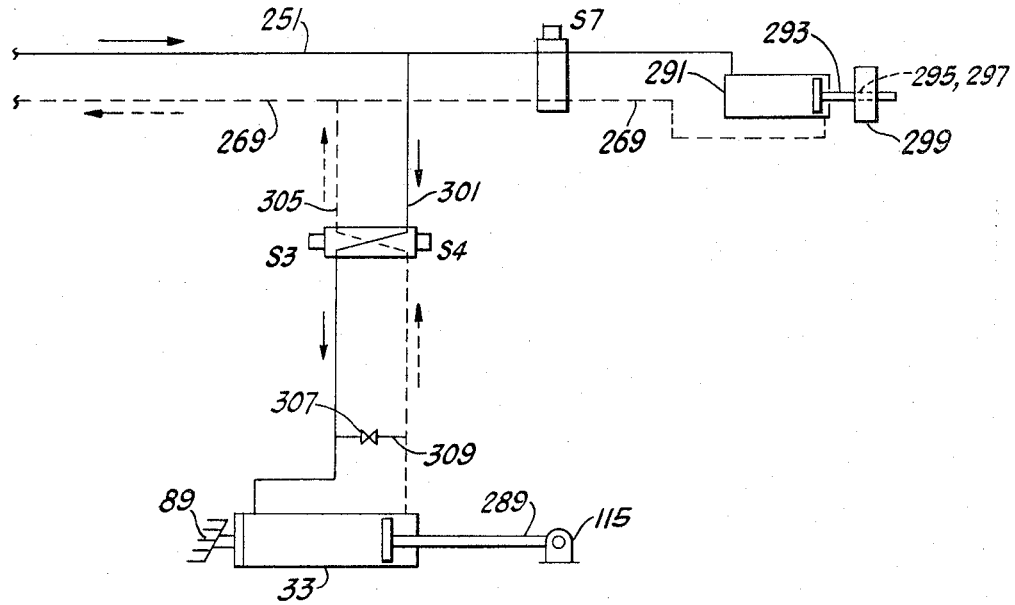
FIGS. 10a, 10b are schematic flow diagrams for change-over of fuel.
Figure 10B:
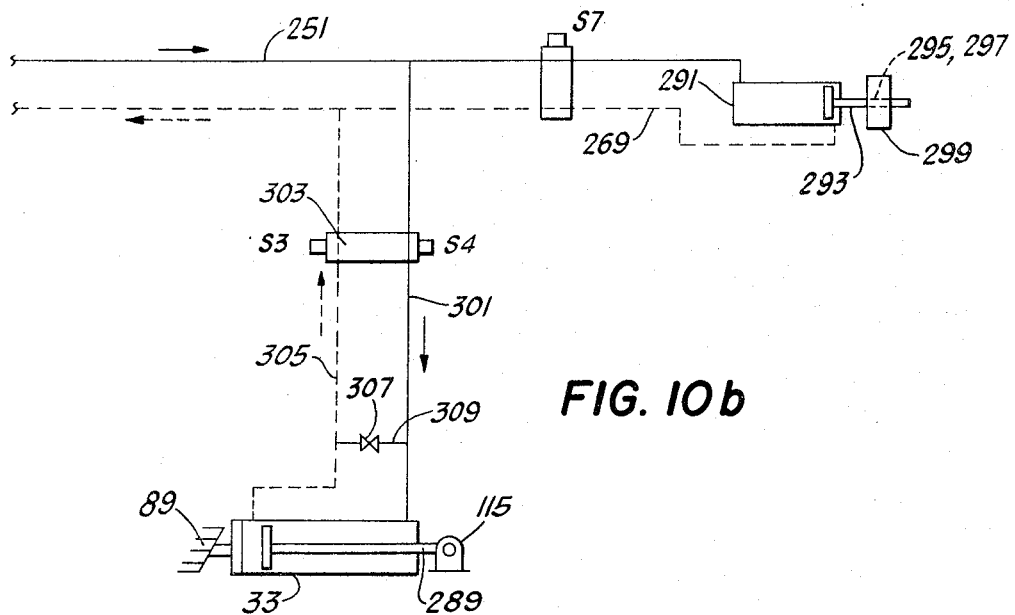

In FIG. 9a, as well as in FIGS. 9b, 9c, and 9d, fluid is contained in a reservoir 245 and is supplied to the control system by a conventional powered fluid pump 247. The fluid flows from the pump 247 in conduit 249 and in branch conduits 251, 253 and 255. Fluid in conduit 251 flows to the change-over cylinder 33, about which more will be said hereinafter, and fluid flows in conduits 253 and 255 to the reversing cylinder 31.

Fluid flowing in conduit 253 passes through a two-way solenoid arrangement 257 comprising solenoid valves S1 and S2.

In like manner fluid flowing in conduit 255 passes through a timer-controlled, two-way valve 259 actuated by a cam 261 and timer T. The cam 261 is located on the reversing table 25.

In the position shown in FIG. 9a, fluid fills both a right-hand chamber portion 263 and a left-hand chamber portion 265 of the reversing cylinder 31. From a previous cycle of operations, fluid that was in the left-hand end of chamber 263 has already flowed through conduit 267 into conduit 269 and thence back to the reservoir 245. In like manner, fluid that was in the left-hand end of chamber 265 has already flowed through conduit 271 into conduit 269 and thence into the reservoir 245.

A by-pass valve 273 is disposed in a conduit 275 connecting conduits 255 and 267, and another similar by-pass valve 277 is disposed in a conduit 279 connecting conduits 243 and 271. These by-pass valves are normally closed, but they may be opened manually in an emergency situation, such as when the pump 245 fails to operate. By opening these valves 273 and 277, the fluid under pressure in the chambers 263, 265 may be vented back to the reservoir 245, thereby allowing the reversing table 25 to be moved manually or by mechanical assisting means.

A conventional check valve 281 is installed in conduit 249 and a conventional accumulator 283 is fluidly connected through conduit 285 with conduit 249 as shown in FIG. 9a. The accumulator is used to preserve fluid pressure in the system in the event the pump 247 should fail.

Reversing of the coke oven valves is initiated from a timing device located in a central control room, and the timing device would be a conventional repeat-cycle timer driven by an electric motor. The timer would have two cams; one would initiate the 1-4, 5 reverse and the other would initiate the 2, 3 reverse.

FIGS. 9a-9d illustrate the various positions of the reversing cylinder 31 during a complete cycle of operations.

FIGS. 10a-10b illustrate the positions of the change-over cylinder 33 when different types of fuel are burned in the heating flues during the cycle shown in FIGS. 9a-9d.

The cycle of operations shown in FIGS. 9a-9d remain the same, and are repeated whether or not underfiring is camed out with the reversing table placed in position for burning coke oven gas, as in FIG. 10a, or with blast furnace gas enriched with coke oven gas, as in FIG. 10b.

Referring to FIG. 9a, when the reversing cylinder 31 reaches the neutral position there shown, a cam 287 on the reversing table 25 actuates the timer 261. After a preselected hold period in the neutral position, a solenoid valve 289 is energized and fluid pressure, flowing in conduit 255, crosses over into conduit 267 and pressurizes port C of the reversing cylinder 263 and vents port D. Whereby, fluid in chamber 263 flows through conduits 255 and 269 back to the reservoir 245. With fluid under pressure at port C the piston-rod assembly 99 moves toward the right, as viewed in FIG. 9a and a reverse 2, 3 burning commences.

The cycle of operations shown in FIGS. 9a-9d does not change. For the purpose of this description of the operation of the invention, it is assumed first that the underfiring is done with coke oven gas. That is to say, the reversing table is where shown in FIGS. 4 and 6 and the change-over cylinder 33 is where shown in FIG. 10a.

The change-over cylinder 33 has an internal piston-rod arrangement which is connected to the clevis 115 on the locking plate 35 and the cylinder itself is attached at 113 to the fixed structure 89.

A conventional solenoid valve S7 is disposed in the fluid conduits 251, 269.

Fluid under pressure flows in conduit 301 from conduit 251 into two-way solenoid valve 303; crosses over therein, and flows in conduit 305, as shown by flow arrows, into the cylinder 33. Fluid flows in conduit 301 from cylinder 33 through the two-way solenoid valve arrangement 303 into conduit 305; thence into conduit 269 and back to the reservoir 245.

A conventional by-pass valve 307 in conduit 309 is normally closed which prevents fluid from flowing between conduits 301 and 305 except when desirable or necessary in emergency situations, as mentioned previously.

When the reversing cylinder 31 moves the reversing plate 37 toward the right, the flange 43 engages rectangular bars 61, 63, 65 and moves them to the right. Bar 67 remains blocked because of the interference between it and the flange 41.

The movement of bars 61, 63, 65 moves control rods 119, 121, 123 toward the right, as viewed in FIGS. 1 and 4. Wherefore, actuator rod 165, as viewed in FIGS. 7 and 8, moves toward the right. In the neutral position (FIG. 9a) the lids 201, 203 are closed and locked.

At the first movement of the rod 165 toward the right, the pin 243 coacts with the slot 235 and rotates the shaft 211 clockwise. Lever 221 rotates clockwise and urges the lever 223 and locking bar 225 toward the left (FIG. 8). The wedges 229 on the locking bar 225 disengage from the wedges 227 on the lids 201, 203 so that these lids are free to rotate clockwise and open when the lever 233 reaches the position shown in dotted outline.

The pin 243a, however, merely slides in the elongate slot 235a, and the lids 202, 204 remain closed and locked.

After a predetermined time period, about twenty-five minutes, on the 2, 3 burning series, the reversing timer calls for a reverse and the solenoid S1 (FIG. 9c) is energized. Valve 257 opens so that pressurized fluid flows in conduit 271 and vents through conduit 253 back to the reservoir 245.

Pressure of fluid at port A urges the reversing cylinder 31 toward the right and such movement brings the reversing mechanism and all of the valves back to the ventral position.

When the reversing plate 37 moves back to the ventral position, the bars 61, 63, 65 also move toward the left (FIGS. 1 and 4) and the bar 61 moves the actuator rod 165 toward the left (FIG. 8). Such movement of the actuator rod 165 returns the open lids 201, 203 to their closed and locked position. Also all other valves are closed when the reversing table is in the neutral position.

When the reversing plate 37 is in the ventral position, a change in the type of underfiring fuel or fuels may be made by energizing the changeover cylinder 33. If no change in underfiring fuel is to be made, the solenoid valve 289 is energized which allows pressurized fluid to flow in conduit 255 and into the cylinder portion 263 (FIG. 9d). The piston-rod 99 then moves toward the left, and the reversing plate 37 also moves toward the left.

When the reversing plate 37 moves toward the left on the 1–4, 5 burning series, the actuator rod 165 (FIGS. 1, 4 and 8) also moves toward the left and at first the pin 243 merely slides in the slot 235. The lids 201, 203 remain closed and locked. But, the pin 243a coacts with the slot 235a and pivots the lever 239a, 221a counterclockwise. This moves the link 223a and locking bar 225a toward the right and disengages the wedges 229a from the wedges 227a. The lids 202, 204 are now free to pivot counterclockwise (as viewed in FIG. 8) to the open position.

After a predetermined length of time, about twenty-five minutes usually, on the 1–4, 5 burning series, the reversing timer calls for a reverse, and solenoid S2 (FIG. 9d) is energized, which actuates valve 257 so that pressurized fluid flows in conduit 253 and into chamber 265 (FIG. 9a). The reversing cylinder 31 and reversing plate 37 then move toward the right and return to the neutral position in which the air lids on the gas or air and waste gas boxes 201, 203 and 202, 204 are closed and locked.

Assuming now that it is desirable to change the type of underfiring fuel from coke oven gas used in the description heretofore, to blast furnace gas (lean gas) enriched with coke oven gas, then the change-over cylinder 33 is actuated so that the locking plate 35 and reversing plate 37 move from the position shown in FIG. 6 toward the left.

FIG. 6a shows the relative positions of the rectangular bars 61, 63, 65, 67, which have not changed from their location in FIG. 6, and the locking plate 35 and the reversing plate 37. It will be clear to those skilled in the art that now the rectangular bar 61 is blocked by the flange 41 and cannot move either right or left during a reversing cycle. This means that the air lids 201, 203 and 202, 204 are closed and locked at all times when underfiring with blast furnace gas enriched with coke oven gas. The cycle described herein before for reversing from 2, 3 burning to 1–4, 5 burning the same; such description being referenced to FIGS. 9a–9d. FIG. 10b shows the relative position of the change-over cylinder 33 and the piston-rod 289 that is attached to the reversing plate. Before the change-over piston-rod 289 moves toward the left, however, solenoid S7 (FIG. 10a) is energized to open the valve associated with it so that pressurized fluid flows in conduit 269. This moves the locking pin 293 toward the left and disengages the locking plate 35 from the bar 299. As soon as the locking plate 35 and reversing plate 37 reach the position of FIG. 6a, the solenoid S7 is deenergized. Fluid under pressure then flows in conduit 251 and the locking pin 293 extends through hole 297 in the bar 299 and holds the locking plate in position.

Those skilled in the art will recognize that the valves which are connected to the actuator rods open and close in response to movement of the respective rods whenever the reversing mechanism changes position as described herein.

A feature of the reversing apparatus of the present invention is that reversing of the valves of a coke oven battery is accomplished simply and readily by a compact and reliable mechanism.

A feature of the invention described herein is that reversing of the valves of a coke oven battery is accomplished by a single two-part cylinder which actuates the reversing table.

A feature of the present invention is that the reversing mechanism automatically ensures that the air lids on the double boxes of the battery are closed and locked when the neutral position of the valves is reached.

A feature of the present invention is that the reversing mechanism automatically ensures that the air lids on the double boxes are and remain closed and locked continually when the battery is being underfired with blast furnace gas or with blast furnace gas enriched with coke oven gas.

A feature of the present invention is that the reversing mechanism automatically opens one-half of the air lids and automatically closes and locks the other one-half of the air lids when the coke oven battery is changed over to coke oven gas firing from the 2, 3 series to the 1–4, 5 series, and vice versa.

Although the invention has been described herein with a certain degree of particularity, it is understood that the present disclosure is made only as an example and that the scope of the invention is defined by what is hereinafter claimed.

What is claimed is:

1. Apparatus for effecting the reversing of the fuel and air valves and thereby the heating cycle of the flues of a coke oven battery comprising:
   (a) a reversing plate;
   (b) a locking plate spaced apart from said reversing plate;
   (c) a plurality of members cooperatively disposed between said reversing plate and said locking plate, each one of said members being connected to an actuator rod;
   (d) means operatively connecting said actuator rods to said fuel and air valves;
   (e) means for moving from a neutral position to a first operative position said reversing plate and certain ones of said members whereby their respective actuator rods move certain ones of said valves and initiate said heating cycle;
   (f) means for moving from said first operative position to a second operative position said reversing plate and certain ones of said members whereby their respective actuator rods move certain ones of said valves and effect a reverse in the heating cycle; and
   (g) means for moving said reversing plate and said certain ones of said members from said second operative position to said neutral position and effecting a change in the heating cycle of said flues.

2. The apparatus of claim 1 including:
   (a) means to move both said locking plate and said reversing plate relative to said members disposed therebetween for changing the type of fuel burned in said flues.

3. The apparatus of claim 1 including:
   (a) a plurality of claims and sprockets connecting said actuator rods to their respective member.

4. The apparatus of claim 1 including:
   (a) a frame supporting said locking plate and said reversing plate and the means to move the reversing plate.

5. Apparatus for effecting the reversing of the fuel and air valves and thereby the heating cycle of the flues of a coke oven battery comprising:
   (a) a frame;
   (b) a reversing plate movably supported by said frame and spaced apart from
   (c) a locking plate movably supported by said frame;
   (d) a plurality of members cooperatively disposed between said reversing plate and said locking plate;
   (e) means on said reversing plate for engaging and moving a first group of said members with said reversing plate when it moves along a first axis;
   (f) means operatively connecting said members to respective groups of said fuel and said air valves;
   (g) means for moving from a first neutral position to a first operative position said reversing plate along said first axis and therewith said first group of said members for initiating said heating cycle;

(h) means on said locking plate engaging certain other ones of said members and preventing their movement with said reversing plate as it moves along said first axis;

(i) means for moving from said first operative position to said neutral position said reversing plate and said first group of said members thereby effecting a change in said heating cycle;

(j) means for moving both said locking plate and said reversing plate from said first neutral position to a second neutral position along a second axis disposed at an angle to said first axis and placing said reversing plate in position to move a second group of said members;

(k) means for securing and maintaining said locking plate in said second neutral position;

(l) means for moving from said second neutral position to a second operative position said reversing plate and a second group of said members whereby their respective actuator rods move certain other ones of said valves and effect a change in said heating cycle:

(m) means for moving said reversing plate and said second group of members from said second operative position to said second neutral position and thence to a third operative position and changing said heating cycle of said flues; and (n) means for moving said reversing plate and said second group of members from said third operative position to said second neutral position thereby changing said heating cycle.

6. The apparatus of claim 5 wherein:
(a) said means for moving said reversing plate along a first axis comprises:
(i) a two-part cylinder wherein each part includes
(ii) a piston and a rod connected thereto that extends out of an end of said cylinder, with
(iii) the end of one piston rod being fixed to said frame and the end of the other piston rod being connected to said reversing table; and
(iv) conduit means communicating with each part of said cylinder for conducting actuating fluid to and away from each cylinder part.

7. The apparatus of claim 5 wherein:
(a) said means for moving both said locking plate and said reversing plate comprises:
(i) a cylinder piston-rod assembly with said cylinder fixedly connected to said frame, and with said rod connected to said locking plate; and
(ii) means on said locking plate cooperating with said reversing plate.

8. The apparatus of claim 5 including:
(a) an actuator rod connected to each said member; and
(b) means connecting each actuator rod to a plurality of said fuel valves and said air valves whereby when said reversing plate moves along said first axis, said valves are actuated.

9. The apparatus of claim 8 including:
(a) a support structure at one corner of said coke oven battery; and
(b) a guide member mounted to said support structure and coacting with said means connecting said actuator rod to said valves.

10. The apparatus of claim 8 including:
(a) a support structure at each corner of said coke oven battery;
(b) a plurality of guide members mounted to each support structure and coacting with the respective means connecting each actuator rod to said valves.

11. In apparatus for effecting a reversal of the heating cycle of the heating flues of a coke oven battery including an actuator rod that is movable along a first axis, and an air box having a lid that is pivotable on a shaft, the improved mechanism for closing and locking said lid when a reversal of the heating cycle occurs, comprising:
(a) a clamp fixed to said actuator rod;
(b) a crank secured to said shaft;
(c) means operatively connecting said clamp to said crank;
(d) a bar movable along a second axis;
(e) a first wedge mounted to said bar;
(f) a second wedge mounted to said lid that is adapted to coact with said first wedge; and
(g) means fixed to said shaft and connected to said bar that is operable when said reversal occurs for moving said actuator rod along said axis in one direction, said lid closing and said first and second wedges coacting and locking said lid in the closed position.

12. In apparatus for effecting a reversal of the heating cycle of the heating flues of a coke oven battery including an actuator rod that is movable along a first axis and first and second air boxes having first and second lids that are pivotable on first and second shafts, the improved mechanism for unlocking and opening said first lid and for simultaneously closing and locking said second lid when a reversal of the heating cycle occurs, comprising:
(a) first and second clamps, each one being secured to said actuator rod in spaced apart locations;
(b) first and second cranks secured to said first and second shafts;
(c) means operatively connecting said first and second clamps respectively to said first and second cranks;
(d) first and second bars that are movable along their respective axes;
(e) a wedge mounted to each of said first and said second bars;
(f) a wedge mounted to each of said first and second lids that is adapted to coact with a respective wedge on said first and second bars;
(g) means fixed to each of said first and said second shafts and connecting respectively to said first and second bars; and
(h) means operating when said reversal occurs for moving said actuator rod along said first axis and said first and second bars along their respective axes, said wedges on said first bar and on said first lid disengaging and with said first crank pivoting and opening said first lid, while simultaneously said second lid closes and said wedges on said second bar and on said second lid coact and lock said second lid in the closed position.

13. The apparatus of claim 12 wherein:
(a) said means operatively connecting said first and second clamps respectively to said first and second cranks includes:
(i) a pin fixed to each clamp and slidable in a slot in each crank.

References Cited
UNITED STATES PATENTS

| | | | |
|---|---|---|---|
| 3,344,039 | 9/1967 | Nestler | 202—151 X |
| 3,433,716 | 3/1969 | Tucker | 202—151 |
| 1,521,298 | 12/1924 | Isley | 137—309 |
| 1,920,911 | 8/1933 | Olsson et al. | 202—151 |
| 1,139,088 | 5/1915 | Tschudy | 202—151 |

NORMAN YUDKOFF, Primary Examiner

D. EDWARDS, Assistant Examiner

U.S. Cl. X.R.

137—309; 202—151